Sept. 16, 1952  J. W. LOFSTEDT  2,610,478
ICE-CREAM FREEZER WITH REFRIGERANT CONTROL
Filed Sept. 12, 1949
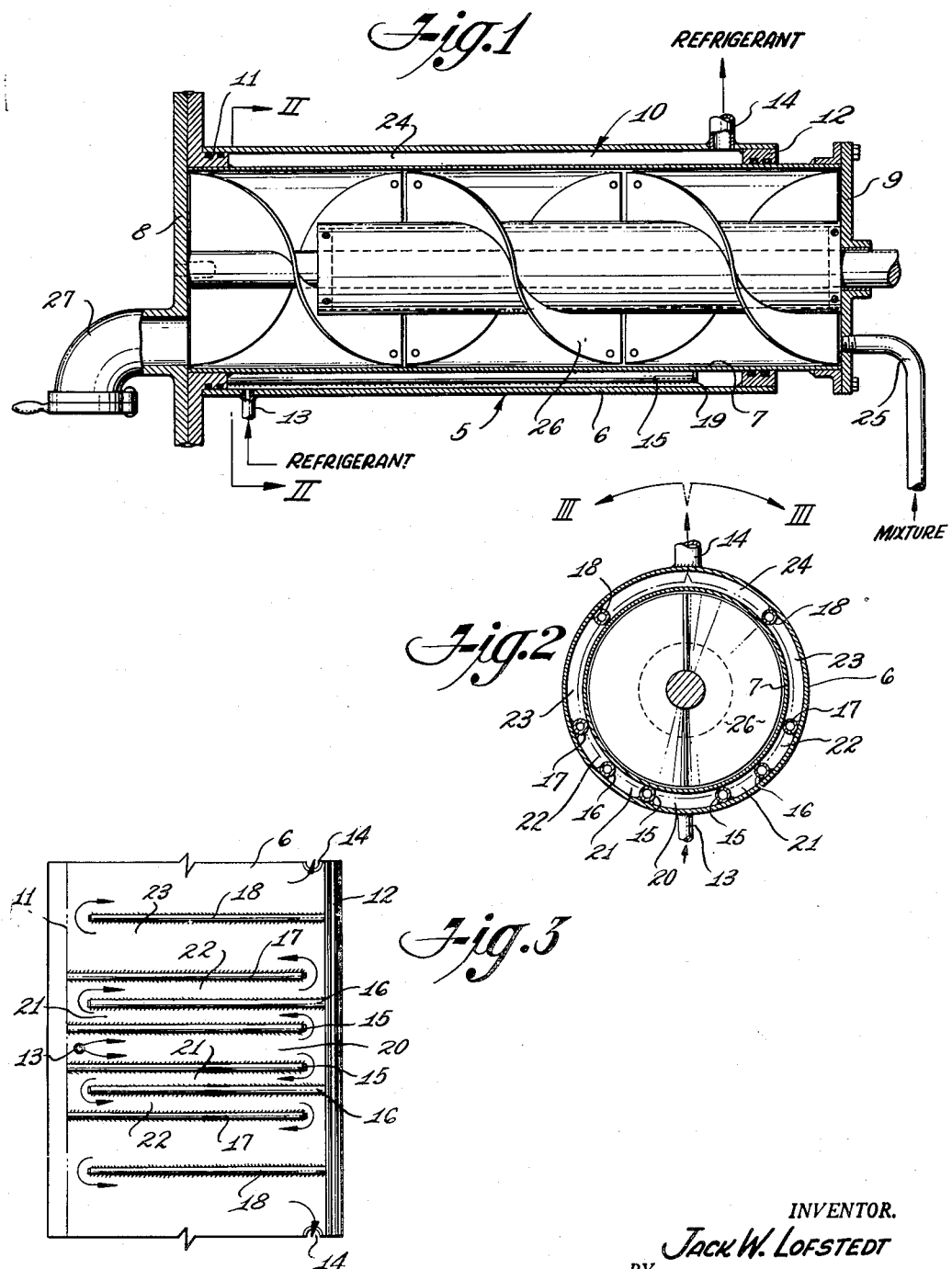
INVENTOR.
JACK W. LOFSTEDT
BY
Harold W. Mattingly
Attorney Patented Sept. 16, 1952

2,610,478

UNITED STATES PATENT OFFICE 2,610,478

ICE-CREAM FREEZER WITH REFRIGERANT CONTROL

Jack W. Lofstedt, Los Angeles, Calif., assignor to Metromatic Products Company, Los Angeles, Calif., a copartnership Application September 12, 1949, Serial No. 115,143

1 Claim. (Cl. 62—114)

This invention relates to ice cream freezers and more particularly to means for controlling the flow of a gaseous refrigerant therein.

In commercial freezing of ice cream and similar products there is a type of apparatus which includes a generally horizontal, cylindrical freezing chamber in which is a movable agitator for stirring the mix as it freezes and for moving the mix from its inlet end to its discharge end. The cylinder is provided with an outer jacket or circulation space for a refrigerant which withdraws the heat from the agitated mix.

It is an object of the present invention to provide means for so controlling the flow of refrigerant in its outer jacket or circulation space that temperature throughout the mixing chamber will be maintained approximately uniform.

Another object of the invention is to provide a refrigerant circulation space wherein the distribution of heat exchange and the control of the flow and pressure of the refrigerant is obtained with the use of a passage in the jacket of the freezer which has an increasingly greater capacity from the inlet to the outlet.

A further object of the invention is to provide a refrigerant control wherein frictional losses will be reduced to a minimum and there will be less pressure drop across the evaporator.

The above and other objects of the invention will more fully appear from the following disclosure made in connection with the accompanying drawing wherein:

Fig. 1 is a longitudinal, vertical sectional view through an embodiment of the invention;

Fig. 2 is a section taken approximately on the line 2—2 of Fig. 1; and

Fig. 3 is an unfolded view taken approximately on the line 3—3 of Fig. 2 as indicated by the arrows in Fig. 2.

The main portion of the apparatus comprises a casing 5 including an outer shell 6 and an inner shell 7, both being of cylindrical shape and provided respectively with end plates 8 and 9. The two cylindrical shells 6 and 7 are concentric to each other and spaced to provide a refrigerant circulation space 10. This space is bounded at its ends by packed sealing elements 11 and 12 which permit longitudinal expansive movement of one cylindrical shell relative to the other. As viewed in Fig. 1 the lower left hand end of the outer cylinder 6 is provided with a refrigerant inlet 13 and the upper right hand portion thereof is provided with an outlet 14 of greater flow capacity than the inlet 13.

Fig. 3 illustrates the cylinder 6 in an unfolded or split and flattened position for the purpose of clarity of disclosure. Welded to the inner surface of the cylinder 6 are pairs of refrigerant control separators 15, 16, 17 and 18 which may be in the form of straight copper tubes of uniform diameter substantially throughout their lengths. As shown in Fig. 1, an end of each tube is preferably slightly tapered for a purpose to be brought out below. This taper is shown at 19 on the right hand end of one of the tubes 15.

The pair of separator tubes 15 is shown in Fig. 3 to lie at either side of the inlet 13 defining an inlet space 20. The left hand ends of the tubes 15 extend to the left hand end of the circulation space 10. The next pair of separators 16 is so located that each of said separators lies laterally outwardly and above its adjacent separator 15 and the space 21 defined by the separators 15 and 16 is less than the common inlet space 20. In accordance with the invention the space 21 is greater than one-half of the space 20.

Separators 17 each lie laterally outwardly from and above their adjacent separators 16, defining a space 22 which is larger and has a somewhat greater flow capacity than space 21. Each of the separators 18 lies considerably above its complementary separator 16, defining a circulation space 23 which in turn is greater than that of the space 22.

As stated above, the separators 15 extend to the left hand end of the general circulation space 10. They terminate at their right hand ends a distance spaced from the right hand end of the circulation area, which is defined by the sealing member 12. The separators 17 extend at their left hand end to the sealing member 11 and are spaced from the sealing member 12 similarly to the separators 15.

The alternate separators 16 and 18 extend from the right hand sealing member 12 to points spaced from the left hand sealing member 11.

The above described arrangement of separators provides a pair of tortuous passages from the common inlet portion 20 upwardly around opposite sides of the casing 5 between the cylindrical shells 6 and 7. At the upper sides of the upper separators 18 the two passages merge into an outlet space 24 which is in flow communication with the outlet 14.

It should be noted that each of the tortuous passages defined by the separators 15, 16, 17 and 18, or the subdivisions of said passages, become increasing greater in cross-sectional area from the inlet side or from the bottom portion of the horizontal cylindrical casing to the top thereof.

A structure such as described above results in less pressure drop across the evaporator of the system and eliminates pressure lifts as in the case of the well-known spiral wrap type of refrigeration conduit. The gradually increased flow capacity or cross-sectional area results in a substantially uniform velocity of gas travel and less frictional loss and also produces a more even temperature throughout the entire freezing chamber.

The separators 15, 16, 17 and 18 are welded to the inner side of the outer shell 6 before the inner shell is inserted. The right hand ends of said separators are tapered as indicated on the separator 15 in Fig. 1 to facilitate insertion of the inner shell 7 when the machine is assembled. Otherwise, throughout the lengths of the separators they are in close contact with the outer surface of the inner shell 7.

The other portions of the structure show the means for handling the ice cream mix. It is introduced through a conduit 25 in the casing end plate 9 and is progressed longitudinally through the inner cylindrical shell 7 by means of a rotating screw 26 which agitates the mix as it is fed toward an outlet spout 27 in the left hand casing end plate 8.

It should be understood that while the apparatus is stated to be used in connection with the manufacture of ice cream it is capable of use in the preparation of other frozen or refrigerated products and that various changes can be made in the details of the structure without departing from the spirit of the invention.

I claim as my invention:

In an ice cream freezer, a cylindrical casing having its longitudinal axis generally horizontally disposed, said casing having an interior portion comprising an ice cream freezing chamber, the cylindrical wall of said casing defining a pair of refrigerant circulation passages leading from the bottom portion of the cylinder wall to the top thereof at opposite sides of the cylinder, the wall of said cylinder having a bottom refrigerant inlet and the top thereof having an outlet, both communicating with said passages, said passages having a common inlet portion at the extreme bottom of the wall of said cylinder, each of said passages extending upwardly from said common inlet portion and about opposite sides of the wall of said cylinder, and each of said passages, after leaving said common inlet portion, having an increasingly greater flow capacity from the bottom to the top of said cylinder wall.

JACK W. LOFSTEDT.

REFERENCES CITED

The following references are of record in the file of this patent:

UNITED STATES PATENTS

| Number | Name | Date |
| --- | --- | --- |
| 1,806,490 | Naumann | May 19, 1931 |
| 1,882,660 | Glauser | Oct. 18, 1932 |
| 2,030,233 | Thoma | Feb. 11, 1936 |
| 2,265,552 | Sticelber | Dec. 9, 1941 |
| 2,356,781 | Morrison | Aug. 29, 1944 |

FOREIGN PATENTS

| Number | Country | Date |
| --- | --- | --- |
| 285,566 | Italy | May 15, 1931 |